United States Patent [19]

Fohrman

[11] Patent Number: 4,717,110

[45] Date of Patent: Jan. 5, 1988

[54] ADJUSTABLE SIGNAGE SYSTEM

[76] Inventor: Scott R. Fohrman, 1123 Linden, Wilmette, Ill. 60091

[21] Appl. No.: 941,600

[22] Filed: Dec. 15, 1986

[51] Int. Cl.[4] .............................................. F16M 13/00

[52] U.S. Cl. ...................................... 248/545; 40/607; 40/611; 211/89; 248/122; 248/156; 248/533

[58] Field of Search ............... 248/122, 121, 125, 518, 248/519, 529, 530, 533, 545, 156, 158, 159, 165; 211/89; 40/606, 607, 610, 611

[56] References Cited

U.S. PATENT DOCUMENTS

| | | | |
|---|---|---|---|
| 1,602,341 | 10/1926 | Day | 211/89 X |
| 1,902,511 | 3/1933 | McDaniel | 40/607 |
| 2,939,236 | 6/1960 | Stein | 40/610 |
| 3,119,619 | 1/1964 | Frank | 248/156 X |
| 3,519,234 | 7/1970 | Matson | 248/156 |
| 4,629,075 | 12/1986 | Hutten | 211/89 |

*Primary Examiner*—J. Franklin Foss
*Assistant Examiner*—David L. Talbott
*Attorney, Agent, or Firm*—Lawrence J. Crain

[57] ABSTRACT

A signage system capable of supporting and displaying at least one variably sized sign is provided comprising a flat base; a blade-shaped support adapter engaging the base; an elongate, vertically-projecting support stem provided with a fixed crossbar at the top of the stem to form a 'T'; and an inverted, sliding crossbar also engaging the stem; both crossbars provided with sign clamping means so that signs of varying sizes may be displayed between the fixed and sliding crossbars. Provisions are also included for inserting the blade-shaped adapter into soil or the like for garden displays, and stem extensions to increase the height of the support stem.

11 Claims, 4 Drawing Figures

ADJUSTABLE SIGNAGE SYSTEM

BACKGROUND OF THE INVENTION

The present invention relates to signage systems used in conjunction with merchandise displays or the like. More specifically, the present signage system relates to applications where a variety of signs may be used to identify or provide price or other information for a constantly changing inventory.

Regardless of whether they are retail or wholesale, bakery or automotive, department store or boutique, merchandisers of all types and sizes require signs to attract, identify, price and otherwise provide information to the customer about displayed goods. The dynamic nature of the marketplace requires that signs be capable of readily adapting to reflect sales, special offers or price increases.

Many merchandisers have adopted signage systems using one-piece metal frames having pedestals. Each frame is capable of holding card type signs designed to easily slide in and out of one side of the frame. The frames are capable of holding a single card, or two cards in back-to-back relationship.

A major disadvantage of this type of signage system is that the fixed frames are capable of displaying only one size of card. Also, in the case of rectangular signs having a first narrow dimension and a second, longer dimension, only one orientation may be displayed: the narrow dimension must be either horizontal or vertical. This is a problem because certain classes of merchandise are enhanced by smaller signs, other classes by larger signs. The same holds true for broad signs versus tall signs. Also, signage for new products will be incompatible with the fixed format of standard metal frame.

In addition, conventional fixed-frame signage systems are provided with a single type of flat base. Although suitable for most merchandise, certain types of packages do not adequately support a flat-based sign. As a result, the conventional sign is often precariously and unattractively placed atop a display of odd-sized packages. Flat-based sign frames are also undesirable in outdoor applications, such as garden stores, where they are difficult to secure from the ravages of wind and rain.

It is, therefore, a major object of the present invention to provide a signage system capable of displaying a wide variety of sizes and shapes of sign cards.

It is another object of the present invention to provide a signage system having a base which is adaptable to a variety of merchandise or package shapes, and is capable of insertion into soil or sand.

It is still another object of the present invention to provide a signage system which is sturdy, attractive, impervious to the elements, and inexpensive to produce in the large quantities required by large scale merchandisers.

SUMMARY OF THE INVENTION

The present invention provides a signage system capable of supporting and displaying at least one variably sized sign, preferably of card stock or the like. Signs may be displayed in side-by-side and/or back-to-back relationship.

More specifically, the present signage system comprises a flat base plate; a blade-shaped support adapter engaging the base and projecting vertically therefrom; an elongate, vertically projecting support stem having at its top a fixed crossbar which forms a 'T'; and an inverted crossbar of similar construction constructed and arranged upon the support stem below the fixed crossbar so as to be vertically adjustable. Both crossbars are provided with integrally-joined clamping bands so that signs of varying dimensions can be securely yet detachably held between them.

The present system can be modified for use in garden applications by removing the flat base and inserting the blade-shaped adapter into the soil or the like. In addition, the height of the display may be increased by the addition of a stem extension and coupler between the support stem and the blade-shaped adapter.

BRIEF DESCRIPTION OF THE DRAWINGS

The many attributes and advantages of the present invention will become more apparent upon an inspection of the drawings wherein.

DESCRIPTION OF THE PREFERRED EMBODIMENT

Figure 1:
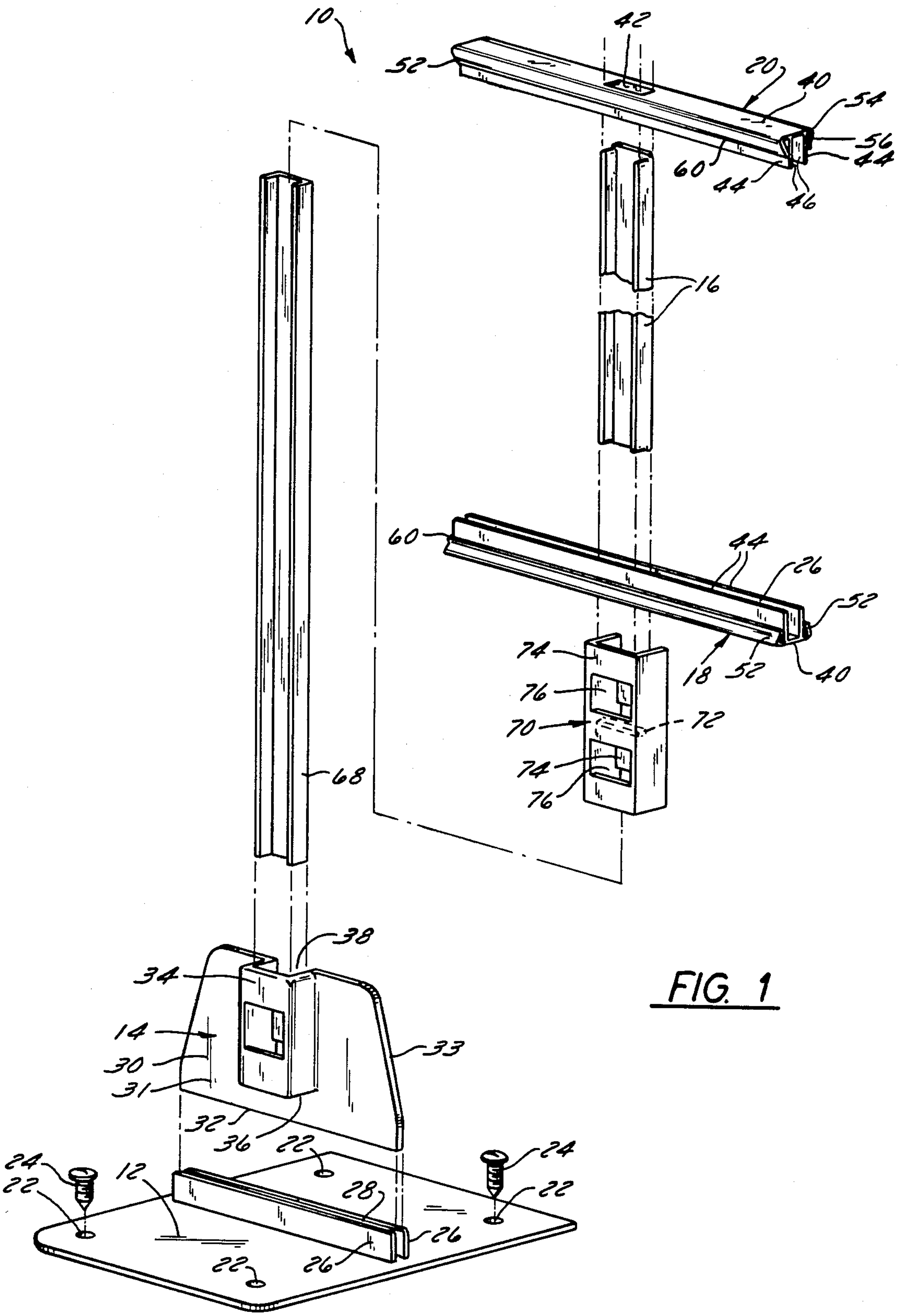
FIG. 1 is an exploded perspective view of the signage system of the present invention.
Figure 2:
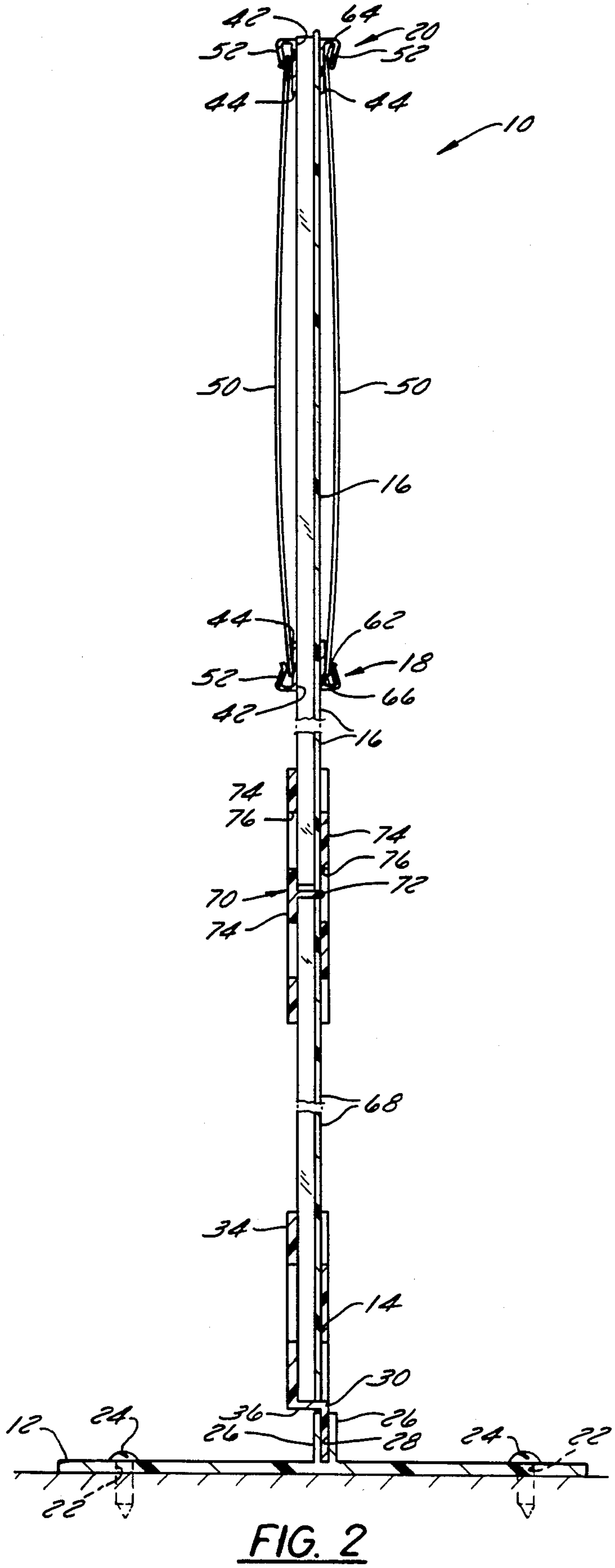
FIG. 2 is a side elevation in partial section of the present signage systems as depicted in FIG. 1.

Referring now to the drawings, wherein like reference numerals designate like characteristics, FIGS. 1 and 2 depict a signage system 10 comprised of a base 12, a blade-shaped support adapter 14, a support stem 16, a sliding crossbar 18 and a fixed crossbar 20. FIGS. 1 and 2 also include the optional stem extension 68 and coupler 70, described below in greater detail.

Base 12 is essentially a thin flat plate or random configuration, but in the preferred embodiment is rectangular. Base 12 is provided with a plurality of mounting apertures 22 designed to enable the signage system to be secured to a substrate by suitable fastener means such as threaded fasteners 24.

A pair of vertically projecting elongate flanges 26 are integrally joined to base 12 in the approximate center thereof, although in some applications, flanges 26 may be mounted off center or at either end of base 12. Flanges 26 are oriented in parallel relationship to each other and are preferably of a length substantially coextensive with base 12. A flange gap 28 is created between adjacent flanges 26. The purpose of flanges 26 is to provide a means of securing blade-shaped support adapter 14 to base 12. Thus, the length and height of flanges 26 must be sufficient to adequately support blade-shaped adapter 14.

Blade-shaped adapter 14 is essentially a flat plate 30 with a face 31 and back 33 having a variety of shapes, but being substantially triangular in the preferred embodiment and having a thickness which will tightly engage flange gap 28. Blade adapter 14 frictionally engages flange gap 28 along a flat edge 32.

A stem socket 34 is integrally joined to either the face 31 or back 33 of plate 30 in a substantially vertical position. Stem socket 34 is essentially a three-sided box channel with a closed end bottom 36 and an open top end 38. The stem socket 34 is dimensioned to frictionally engage support stem 16 and to secure it in an upright position. When the present signage system 10 is assembled, one end of support stem 16 is seated within socket 34 at a closed end 36.

Support stem 16 is an elongate member which, in the preferred embodiment, is 'C'-shaped in cross section, but may be box shaped, 'I'-shaped or having any other conventional configuration used to re-enforce an elongate support member. In addition, stem 16 may be provided in any desired length which can be adequately supported by the base assembly described above.

Figure 4:
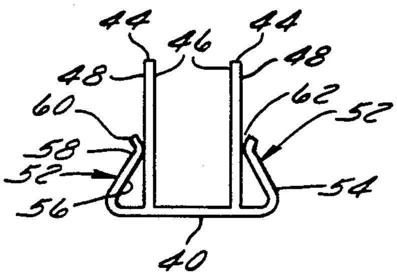
FIG. 4 is an enlarged side elevation of the sign clamping means of the present invention.

Referring now to FIGS. 1, 2 and 4, sliding crossbar 18 and fixed crossbar 20 are identical in configuration, the only difference being that the fixed crossbar 20 is secured to the top of support stem 16 and is inverted relative to sliding crossbar 18. Each crossbar 18, 20 is comprised of an elongate floor 40 with a central stem aperture 42 designed to frictionally engage vertical support stem 16. Fixed crossbar 20 is fastened to support stem 16 at stem aperture 42, either by adhesives or by welding.

On either side of stem aperture 42 are found vertically projecting walls 44, integrally joined in parallel relationship to floor 40. Walls 44 have an inner face 46 and an outer face 48. Inner faces 46 contact vertical support stem 16, while outer faces 48 provide a backing against which a sign 50 is held by clamping means 52.

Clamping means 52 is comprised of a curved portion 54 which is basically an integrally formed extension of each elongate edge of crossbar floor 40. Curved portion 54 has an interior concave portion 56 which fronts the outer faces 48 of walls 44. The top edge 58 of curved portion is provided with an outwardly directed lip 60 to facilitate the insertion of sign 50 into the gap 62 between concave portion 56 and wall 44. Lip 60 gives curved portion 54 a height which is approximately one-half that of wall 44. Clamping means 52 is preferably coextensive with crossbar floor 40, although shorter or segmented lengths are acceptable.

Sliding crossbar 18 is positioned upon support stem 16 so that walls 44 project upwardly from crossbar floor 40, while fixed crossbar 20 is positioned upon stem 16 so that its walls 44 project downwardly from floor 40. The friction fit of the crossbar stem aperture 42 about vertical support stem 16 allows sliding crossbar 18 to be vertically adjustable to accommodate signs 50 of varying lengths.

In operation, a sign 50 comprising a paper card or display card of varying thickness, as well as variable width and height, is positioned so that its top edge 64 is inserted into one of the two lip gaps 62 of clamping means 52 on fixed crossbar 20. Sliding crossbar 18 is then vertically adjusted upon support stem 16 so that the lower edge 66 of sign 50 is inserted into its adjacent lip gap 62.

If desired, two signs 50 may be placed in back-to-back fashion, one in each gap 62 of sliding crossbar 18 and fixed crossbar 20.

In cases where outdoor or garden display is called for, base 12 may be removed, and the blade edge 32 of blade-shaped support adapter 14 may be inserted directly into the soil.

Referring now to FIGS. 1 and 2, the preferred embodiment is pictured wherein support stem 16 is of insufficient length for a particular application. In such applications, a stem extension 68 may be employed. Stem extension 68 is an elongate member of varying lengths, otherwise having substantially identical dimensions to support stem 16.

Figure 3:
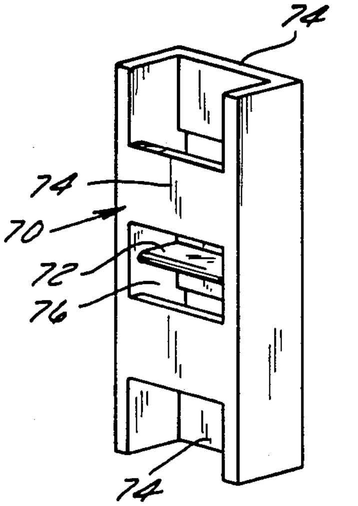
FIG. 3 is a perspective elevation of the stem coupler of the present invention.

In applications where more height is required, one end of stem extension 68 is inserted into stem socket 34. The opposite end is inserted halfway into stem coupler 70, depicted in FIG. 3, which is a tubular box channel dimensioned to frictionally engage both stem 16 and stem extension 68. Stem coupler 70 is provided with a stop 72 midway in the channel so that stem 16 and stem extension 68 are equally positioned therein. When longer signs 50 need to be displayed, sliding crossbar 18 may also be slidably positioned upon stem extension 68.

Thus, depending upon the size of the sign, and the type of application, signage system 10 may be assembled with either support stem 16 or stem extension 68 inserted into stem socket 34, or with sliding crossbar 18 located on support stem 16 or stem extension 68. In addition, signage system 10 may be assembled with or without base 12.

All the components of sign system 10 are preferably manufactured of polymeric materials. As such, stem socket 34 and stem coupler 70 are shown comprised of alternating panels 74 and windows 76, being exemplary of conventional methods used in plastic molding for conserving materials. Stem 16, stem extension 68 and crossbars 18, 20 may be either molded or extruded.

Although various embodiments of the present signage system have been shown and discussed, it will become obvious to those skilled in the art that departures can be made with regard to various components without departing from the spirit and scope of the claims.

What is claimed is:

1. An all plastic signage system capable of supporting and displaying at least one variably-sized sign comprising:

a flat base having mounting means;

a support adapter constructed and arranged to engage said mounting means;

an elongate, vertically-projecting support stem which releasably engages said support adapter;

a fixed crossbar integrally joined to the top of said support stem to form a 'T', said crossbar having integrally formed upper sign clamping means;

a sliding inverted crossbar having integrally formed lower sign clamping means and constructed and arranged to slide vertically with a friction fit on said support stem to securely hold signs of a variety of sizes against said fixed crossbar;

said upper and lower sign clamping means extending the full length of the respective crossbars;

said fixed and inverted crossbars each including:

a flat base member having a length and a width, oriented parallel to the plane of said flat base, and having a central aperture which engages said support stem;

a pair of flanges projecting vertically from and integrally joined to said base member in parallel orientation, one on each side of said support stem and coextensive with the length of said base member;

said sign clamping means joined to said base member so as to clamp said sign against at least one of said flanges; and including a spring clip coextensive with said base member and integrally joined thereto.

2. The signage system defined in claim 1 wherein said sign clamping means are located on said base member to clamp a sign against both of said flanges, in back-to-back fashion.

3. The signage system defined in claim 1 wherein said support adapter is provided with a broad blade shape to enable insertion of said signage system into soil or the like without the use of said flat base.

4. The signage system defined in claim 1 further including an elongate stem extension having two ends and a stem coupling means having a top, bottom and an internal stop.

5. The signage system defined in claim 4 wherein said stem extension engags said support adapter at one end, said stop of said stem coupling means at the other, and said support stem is inserted into said top of said coupling means to engage said stop.

6. The signage system defined in claim 5 wherein said sliding crossbar is positioned on said stem extension.

7. An all plastic signage system capable of supporting and displaying at least one variablysized sign of card stock or the like comprising:

a flat base having mounting means including a pair of vertically-projecting, elongate flanges in close parallel orientation;

a support adapter having a flat blade designed to frictionally engage said base between said flanges:

an elongate, vertically-projecting support stem releasably engaging said support adapter;

a fixed crossbar integrally joined to the top of said support stem to form a 'T', said crossbar having integrally formed upper sign clamping means; and a sliding inverted crossbar having integrally formed lower sign clamping means and constructed and arranged to slide vertically with a friction fit on said support stem to securely hold signs against said fixed crossbar;

said upper and lower sign clamping means extending the full length of the respective crossbar;

said fixed and inverted crossbars each including:

a flat base member having a length and a width, oriented parallel to the plane of said flat base, and having a central aperture which engages said support stem;

a pair of flanges, projecting vertically from and integrally joined to said base member in parallel orientation, one on each side of said support stem and coextensive with the length of said base member;

said sign clamping means joined to said base member so as to clamp said sign against at least one of said flanges; and including a spring clip coextensive with said base member and integrally joined thereto.

8. The signage system defined in claim 7 further including a stem extension and a stem coupling means having a top, bottom and an internal stop.

9. The signage system defined in claim 8 wherein said stem extension engages said support adapter at one end, said stop of said stem coupling means at the other end, and said support stem is inserted into said top of said coupling means to engage said stop.

10. The signage system defined in claim 9 wherein said sliding crossbar is positioned on said stem extension.

11. An all plastic signage system capable of supporting and displaying at least one variably-sized sign of card stock or the like comprising:

a flat base having mounting means including a pair of vertically-projecting, elongate flanges in close parallel orientation;

a support adapter having a flat blade designed to frictionally engage said base between said flanges;

an elongate, vertically-projecting support stem releasably engaging said support adapter;

an elongate stem extension having two ends, the first of which is designed to engage said support adapter;

a stem coupler having a top, bottom and an internal stop, located between said top and bottom of said coupler, said bottom engaging the second end of said stem extension, said top engaging the bottom of said support stem;

a fixed crossbar joined to the top of said support stem to form a 'T';

an inverted sliding crossbar frictionally slidingly engaging said support stem or said stem extension in the same vertical plane as said fixed crossbar;

said crossbars each including:

a flat base member having a length and a width, oriented parallel to the plane of said flat base, and having a central aperture which engages said support stem;

a pair of elongate flanges projecting vertically from said base member in parallel orientation, one on each side of said support stem and coextensive with the length of said base member; and sign clamping means comprising a one-piece spring clip joined to each side of said base member and being coextensive therewith to clamp signs against said flanges.

* * * * *